Sept. 25, 1951 L. HAAPALA 2,569,308
MACHINE FOR SHREDDING AND DISINTEGRATING
VEGETABLE STALKS
Filed Sept. 8, 1949 2 Sheets-Sheet 1
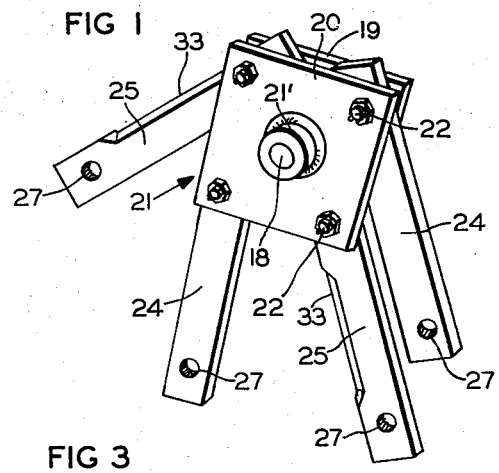
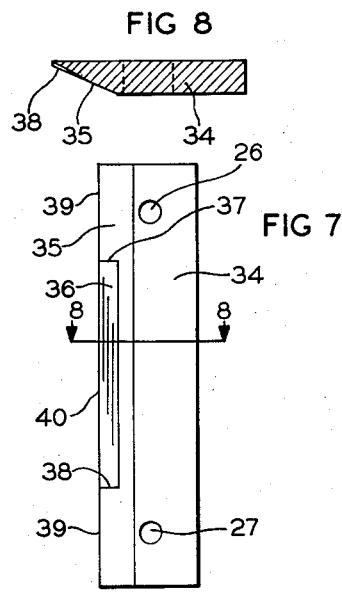
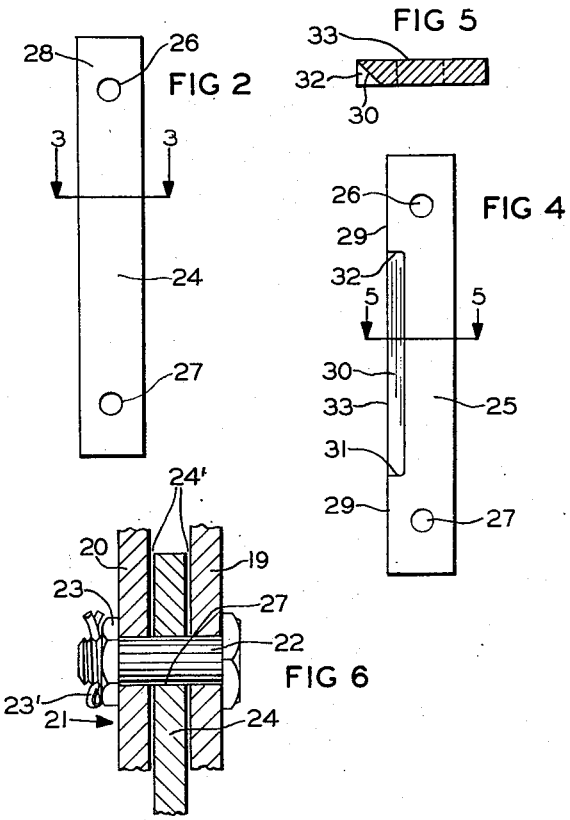
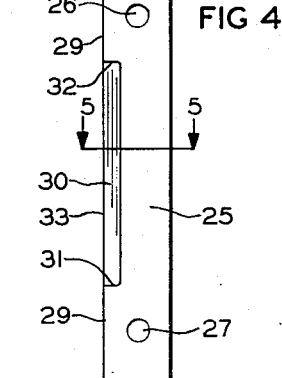
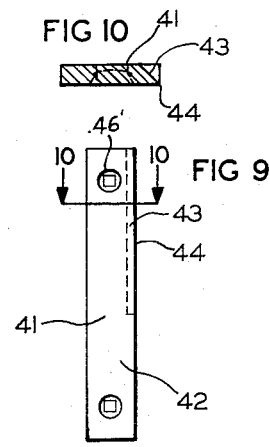
INVENTOR.
LEVI HAAPALA Sept. 25, 1951   L. HAAPALA   2,569,308
MACHINE FOR SHREDDING AND DISINTEGRATING
VEGETABLE STALKS
Filed Sept. 8, 1949   2 Sheets-Sheet 2
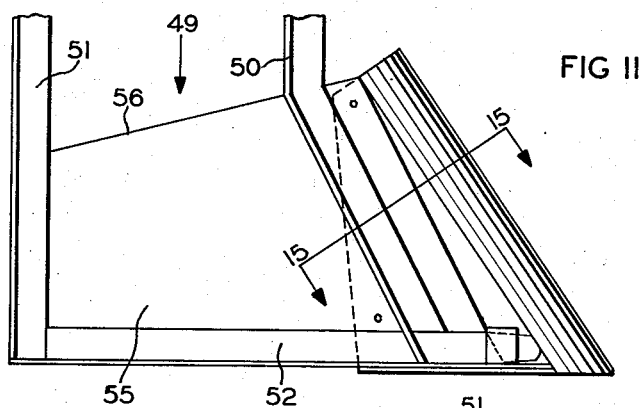
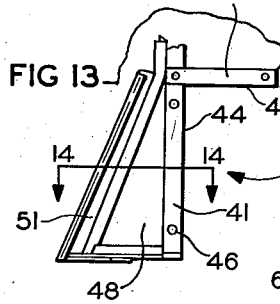
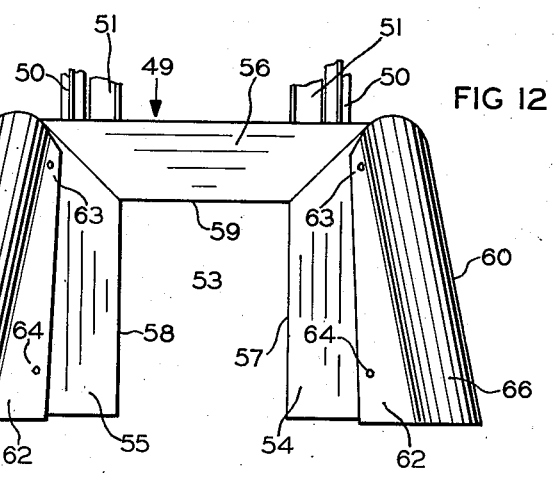
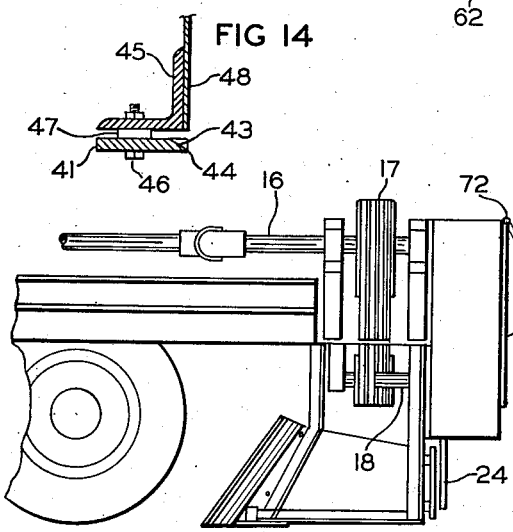
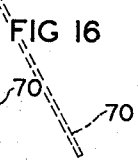
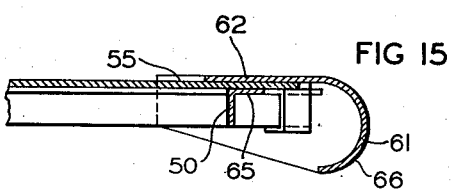
INVENTOR.
LEVI HAAPALA Patented Sept. 25, 1951

2,569,308

UNITED STATES PATENT OFFICE 2,569,308

MACHINE FOR SHREDDING AND DISINTEGRATING VEGETABLE STALKS

Levi Haapala, Dassel, Minn., assignor to Whiteley and Caine, Minneapolis, Minn., a partnership Application September 8, 1949, Serial No. 114,564

6 Claims. (Cl. 55—61)

My invention relates to a machine for shredding and disintegrating vegetable stalks, and has for its object to provide a novel form of beater bar member acting as the principal of a swinging flail which operates in conjunction with a shear plate carried on the rear end of a tunnel-like throat, and for providing means for projecting and guiding cornstalks into the front end of said throat.

The purpose of such shredding and disintegrating machines is to operate upon the rows of stalks, such as cornstalks, cottonstalks and the like and completely cut to pieces and disintegrate the entire stalk including the rootstalk upon which the plant has grown.

Heretofore efforts have been made to accomplish this result by the use of cutting members rigidly mounted on a rotating shaft, which members are ineffective where any considerable number of rocks exist on the field, as is commonly the case in many sections of the country. For if the cutters are set to cut close to the ground level and through the mounds of earth of the rootstalks, rocks encountered will cause breakage and destruction of the cutter members.

Other efforts to accomplish the above indicated results have been to mount a large number of pivoted arms directly upon a shaft close together and with the shaft at right angles to the rows so that these members work along the rows. None of these devices has been truly satisfactory or even approximately successful.

I have discovered that if a steel bar of somewhat massive size and weight is pivotally connected at points upon rigid members which bring the pivots some distance from the axis of the shaft for rotating the members, and more particularly if some of the bars are formed with bevelled sharp edges along a portion only of their lengths and which cooperate with a stationary beveled shear plate, highly effective cutting and disintegrating will result.

I have also discovered that if the tunnel and particularly the means for gathering the stalks in the tunnel and laying them substantially horizontal, be formed with a front end opening having sides and top converging rearwardly and provided with side members formed with semi-cylindrical outer portions for contacting and gathering together the cornstalks together with a shear plate carried on the tunnel, the operation of the bars will be substantially more effective.

It is the object of my invention, therefore, to provide in combination with a shear plate having a right angle corner a hammer-type beater bar normally rectangular in cross-section with head portions at each end formed with a pivoting hole and with a bevelled cutting edge between the head portions of said bar adapted to be mounted between plates rigidly secured to a driving shaft and rotated transversely to the shear plate so as to produce a shearing action between the coacting edges of the bars and the shear plate.

It is a further object of my invention to provide in combination with a stationary beveled shear plate a bar rectangular throughout its length, except that along one edge there is a flat bevel and a second bevel insert in the first bevel and with head and holes adapting the same to be mounted as the first described bar is mounted.

It is a further object of my invention to provide in association with said mounted and operating bars and at the rear end of the throat, a knife-like member secured to the side of the throat with the bevelled cutting edge extending only part way of its length so that the bottom rectangular portion of the bar will be presented to engage any stones, rocks or other obstructions and to aid in cutting only parts of stalks driven against such bar in the operation of the machine.

It is a further object of my invention to mount between the plates of the rotatable head, preferably at the four corners thereof, a multiplicity of bars, preferably four in number, of which the bars are alternately rectangular in cross-section and bevelled in cross-section, so that the two types of bars operate cojointly.

It is a further object of my invention to provide at each side of the front end of the throat of a machine in which any or all of the type of bars above described are used, a rolled steel member diverging in the top of the opening into the throat and extending forwardly to a substantial point adjacent the ground on which the machine has been operating.

This application is a modification of my previously filed applications, Serial No. 60,437, filed November 17, 1948, and Serial No. 76,378, filed February 14, 1949.

In the drawings illustrating an application of my invention in some of its forms:

Fig. 1 illustrates a driving head and a driven shaft with four bars pivotally mounted at the four corners of two plates forming the driven head, two of said bars being rectangular in cross-section, and the other two bars provided with short sections of bevelled knife edges between opposite ends of the bars.

Fig. 2 is a plan view of a hammer bar which is normally rectangular in cross-section.

Fig. 3 is a section of said bar taken on line 3—3 of Fig. 2.

Fig. 4 is a plan view of a bar similar to the bar of Fig. 2 except that a portion thereof between the opposite ends of the bar has along one edge a bevel producing a cutting edge.

Fig. 5 is a sectional view taken on line 5—5 of Fig. 4.

Fig. 6 illustrates the manner in which the bars of Fig. 2 and Fig. 4 are mounted between plates on the rotatable head.

Fig. 7 is a plan view of a bar which has a broad bevelled edge along one side of it and a second bevel formed along the bevel face of the first bevel, which provides a cutting edge along the central portion of the last named bar.

Fig. 8 is a sectional view taken on line 8—8 of Fig. 7.

Fig. 9 is a plan view of a shear plate or cutting bar adapted to be secured to the rear of the throat at its point of opening across which the bars of Figs. 2 and 5 operate.

Fig. 10 is a sectional view along line 10—10 of Fig. 9.

Fig. 11 is a side elevation view of the stalk-gathering tunnel or throat showing stalk-contacting and gathering members secured to a front side edge thereof.

Fig. 12 is an elevation view of the front of the stalk-gathering tunnel or throat with two of said stalk-contacting and gathering rolled edge members thereon.

Fig. 13 is a view from the rear of one-half of what is shown in Fig. 11 showing the cutting knife of Fig. 9 in position at the rear of the throat.

Fig. 14 is a sectional view taken on line 14—14 of Fig. 12.

Fig. 15 is a sectional view taken on line 15—15 of Fig. 11.

Fig. 16 is a side elevation view of the assembled stalk cutter showing the drive of the beater-bar carrying heads.

As illustrated, shaft 16 is the main power shaft which may, through connection with the power takeoff of a tractor, drive the main power pulley 17, and that in turn will drive shaft 18 which is the drive shaft illustrated in Fig. 1, which has fast thereon the two plates 19 and 20 which together form the head for beaters hereinafter described.

The plates 19 and 20 are well shown in Fig. 6. All of the beaters, of whichever kind used, which are connected with the head, designated generally as 21, are secured in position as indicated in Fig. 6. Bolts 22 extend through the plates 19 and 20 and have thereon a nut 23.

When this nut is fully turned down on the head plates it holds them together, but leaves a tolerance space on each side of the beater bars, as indicated in considerably exaggerated form at 24'. After the nut 23 has been set, a cotter pin 23' is inserted in a specially drilled hole for that purpose which keeps the assembly together and additionally resists lateral strains on the plates.

The beater bars of Fig. 2 are designated 24 and the beaters of Fig. 4 are designated 25. A beater 24 is shown assembled on bolt 22 in Fig. 6. All of the beater bars are provided with holes 26 and 27 at opposite ends of the beaters.

The shape, form and size of these beater bars have been carefully thought-out structures and are highly important in producing the beater structure which is completely effective for the purpose intended, namely, that of disintegrating the entire portion of the stalk above the ground level and including the rootstalks.

This complete disintegration is of the highest importance in connection with the form, purpose and advantage of using my disintegrator. That purpose is to destroy the larva nests of the corn borer, which is developing into a highly dangerous threat to the important American corn crop. The corn borer moths lay eggs in the cornstalk, particularly those parts of it close to and in the rootstalk. It is the developing larvae in these locations which seriously injure and reduce the corn bearing capacity of the cornstalk. When these larvae have lived on the sap and pith of the cornstalk for a requisite length of time they form pupa in nests which they have created within the lower body of the cornstalk. Here they hibernate through the winter, and in the spring or early summer find a way out of their nests as moths which lay eggs for germinating the fresh crop of destructive larvae.

If the cornstalk, after the crop has been harvested, is completely disintegrated and the parts of the stalk having the pupa nests are opened up, the pupae die and cannot become egg-laying moths. But the pupa-holding parts of the cornstalks must be thoroughly disintegrated, as the pupa can live in pieces of cornstalk even after the stalks have been partially disintegrated and very probably even after they have been plowed under the ground.

It follows that the machine to be effective for the purpose intended must be dependable to disintegrate all parts of the cornstalks. My beaters, operating as disclosed here, and formed as now will be disclosed, have been proved effective to produce this complete disintegration.

My development and experimental work has demonstrated that rigid cutting or beating bars are of very small value, both because they do not have the same effective action as do swinging bars and because much agricultural land contains stones of various sizes, which if contacted with rigid beaters will quickly destroy them and render the machine inoperative.

These experimental operations also have demonstrated that only beater bars which are liberal in size as to all dimensions and which are formed of steel capable of resisting the kind of shock to which they are subjected, and which have quite exact necessary dimensions, can produce the most effective disintegration of cornstalks. These beater bars must be heavy enough so that as they are rotated at the very high speed necessary there is given to them the necessary inertia to produce strong striking blows, and at the same time, if they are made too heavy, the centrifugal force exerted in rapid rotation may tend to deform or destroy their supports and also to destroy the tractor transmission.

The beater bars are pivoted to head members on the end of the driven shaft 18, which head members 19 and 20 may be made of any desired shape, but preferably square. These members may be from seven to nine inches square and preferably, in my experience, are most effective at eight inches square.

The head plates 19 and 20 are rigidly welded on the hub 21' and are spaced apart so that the bars 24 and 25 will be free to swing on the bolts 22 which hold them removably supported on the head, as heretofore described.

The head plates 19 and 20 are not only rigidly welded on the hub 21 with their inner walls parallel, but are very heavy and massive to resist lateral strains when the beaters strike rocks which would tend to move them laterally.

Also the bolts 22 heretofore described, extend with a close tolerance through holes 26, 27, which holes are three-quarters inch in diameter so the bolts themselves are just a tolerance shade less than three-quarters inch in diameter. That, and the close tolerance of beaters 24 (or 25) with substantial engagement with the inner walls of plates 19 and 20, while permitting ready and free rotation and swing of the beater bars at the same time, have large areas resisting the deforming effect of hitting the sides of rocks.

It must be remembered that the work to be done by my machine varies greatly according to the conditions of plant growth. A very heavy load is imposed when, as is frequently desirable, green corn such as the corn from which the ears have been removed for canneries is to be disintegrated to be immediately plowed under.

The weight of the beater bars I have found should be from three and one-half to four and one-half pounds, and the manner in which they are pivoted between the plates of the rotating head and their length all enter into the solution of the problem of meeting successfully this varying load. Knives or beaters rigidly attached to the shaft or to a head plate thereon cannot properly care for these varying loads, and practical destruction of the machine frequently takes place, to my knowledge in connection with many competitive demonstrations I have had with my machine and other machines. This destruction of rigid beater blades may take place from action on the material alone and always will take place where there are rocks to be contacted.

The beater bars are pivoted at a distance from the axis of the driven shaft near the corners of plates 19 and 20. The shaft is rotated at around or greater than 1200 R. P. M.

Only massive and extremely tough beater members, as above outlined have been found effective for the purpose. From the above noted research and development work, I have found best results from having the overall length of my beaters at thirteen inches, their width two inches, thickness one-half inch, made of the very best quality of special alloy steel, having qualities of extreme toughness. The holes and the bolts which go through the holes are substantially three-fourths inch in diameter with a tolerance of 1/64 of an inch, as indicated in exaggerated form at 24′ of Fig. 6.

The holes are placed one and five-eighths inch at centers from the ends of the bars, leaving solid head surfaces at 28 in the form of Fig. 2 and at 29 in the form of Fig. 4, for contact with rocks or other obstructions as the bars are rotated at the above named high speed.

In the bars of Fig. 4 a bevelled portion 30 has its ends 31 and 32 positioned three inches from the respective ends of the beater bars. The bevel is substantially a 45 degree bevel which produces a fairly sharp cutting edge at 33. On each side of the ends 31 and 32 of the bevel 30 are formed three inch long heads 29 which are rectangular in cross-section. These heads strike rocks or other obstructions, in advance of the cutting edge 33 reaching these rocks, and either knock them out of the way of the cutting edge or bounce the beater bar backwards so that the cutting edge is not injured.

The combination of two beater bars 24 without cutting edge alternated with two beater bars 25 having the cutter edges have proved very effective to accomplish my purpose, with green or wet material. It can, however, be operated with all the beater bars rectangular throughout as in Fig. 2, or with all of them as in Fig. 4, as conditions may require.

In very wet and heavy material it may be desirable to use on the head only the bars 25 embodying cutting edges. On the other hand where the cornstalks are dry and thoroughly cured and there is no green or wet material effective results may be obtained by using all of the beaters on the heads, like beaters 24, rectangular in cross-section throughout their lengths.

With the shaft 18 rotating at 1200 R. P. M., as it is tractor pulled slowly along the rows of corn, it will be seen that a rain of blows, both with the blunt edge of the beater bars 24 and with the cutter edge of beater bars 25, is impacted upon the entire length of the stalk. The drier parts of the stalk are crushed and broken by the one-half inch wide edge of beater bars 24. Extended shreds or moist portions of cornstalks are cut into innumerable tiny lengths by the cutting edge 33 of the beater bars 25.

A form of bar shown in Figs. 7 and 8 may be successfully used where the ground is practically free from stones or other obstructions. This bar 34 differs from the bar 25 of Fig. 4 by having a bevel the full length, indicated at 35, and a second bevel 36 which cuts into the bevel 35 to leave thin shoulders 37 and 38 at the end of bevel 36, as clearly shown in Figs. 7 and 8. Holes 26 and 27 are formed in this bar leaving similar heads 39 on each side of the bevel 36, which forms a sharp cutting edge at 40.

As shown in Figs. 13 and 14, the cutting member of Figs. 9 and 10 is secured to the rear end of the throat of the machine. This cutting member comprises a fairly heavy bar 41 of hard and strong steel which has, as it is positioned in the machine, a lower portion 42 of rectangular cross-section, and an upper bevel 43 which provides a cutting edge 44 throughout the length of the bar above the portion 42.

As shown in Fig. 14, the cutting bar 41 is secured to angle iron 45 by means of bolt 46 passing through countersunk openings 46′ with a spacer 47 between bar 41 and angle iron flange 45. The bevel 43 turns outwardly, as shown in Fig. 14, so that the cutting edge 44 lies along and close to the rear edge of the throat, indicated at 48 in Fig. 14.

A second bar 41′ of dimension similar to bar 41 extends at right angles thereto across the top of the tunnel throat, as shown in Fig. 13, and operates to further cut any material which is brought up in that position. Further the box 70 in which my beaters operate is so constructed that any material which is carried up into the box will be repeatedly hit by beater bars, and if any considerable amount of material accumulates within that box, it will escape by pushing backwardly the door 71 hinged at 72 at the top of the beater box.

Disintegrating bars 24 and 25, or either thereof, therefore, are carried in the direction of the arrow past this cutting edge 44 pushing any material not theretofore disintegrated against the cutting edge and further disintegrating it.

As shown in Figs. 11 and 12, the stalk-gathering tunnel member is designated generally by the numeral 49. This member 49 is supported by sets of angle irons 50 and 51 on each side thereof, which are connected to bottom edge angle irons 52.

The throat at its rear or exit side is shown in Fig. 12 at 53, and the tunnel itself comprises side walls 54 and 55 and a top wall 56. The two side walls 54 and 55 converge rearwardly to the throat outlet edges 57 and 58, while the top wall 56 slopes downwardly to the top edge 59 of the outlet of the throat 53, along and across which at such outlet the beater bars are moved at very high speed directly past the cutting edges 44 and 44' of bars 41.

As clearly shown in Figs. 11, 12 and 15, to the angle irons 50 on each side of the throat 53 are secured a pair of buffer guides 60 and 61. The walls 54 and 55 are directly secured to the angle irons 50, Fig. 15, and a plate portion 62 of the respective buffer guides 60 and 61 are secured by rivets or bolts 63 through the side walls 54 and 55 to the flanges 65 of angle irons 50.

As clearly shown, these buffer guides extending from the plate portions 62 have broadly curved outwardly extended wing members 66, which are semi-cylindrical in contour and substantially semi-circular in cross-section. These buffer guides are made of fairly heavy sheet metal and produce the important effect not only of being economical to build and replace, but, much important, of forming wide curving portions for contact with the cornstalks, weeds and other growth which readily ride over this broad surface and are brought within the tunnel to be disintegrated.

The advantages of my invention as set forth in this specification are of the highest importance in shredding and disintegrating cornstalks.

This extraordinary performance in which the cornstalks are perfectly shredded and stringy or wet portions cut into tiny pieces, comes largely from the use of pivoted bars of comparatively massive structure and with hammerheads which contact rocks, to prevent injury to cutting edges, with such terrific force that frequently the rocks are broken in the field and yet no injury to the beater bars or any part of the machine results.

Four features of my invention enter into the accomplishment of this result:

First, the massive and relatively long beater bars themselves, each of which weighs four and one-half pounds, and which are fabricated of an extremely hard and tough form of steel with the dimensions heretofore given.

Second, the pivoting of these bars, not at or near the rotating shaft, but at points (at the corners of the heads) which are removed a very considerable distance from the axis of the shaft and which gives to the bars a greatly increased leverage over what would be true if they were pivoted immediately adjacent the rotating shaft.

Third, the very high speed of rotation of the shaft, usually in excess of 1200 R. P. M.

Fourth, the tunnel pickup and its entrance structure whereby the cornstalks are very definitely brought to the outlet of the tunnel, where the beater bars operate upon the stalks, in perfectly assembled relation nearly parallel with the ground.

A further set of advantages of my invention resides in the fact that the beater bars, particularly with the beveled edges, create a strong suction through the tunnel which aids in drawing material of generally light character into the tunnel where it is subjected to the action of the beater bars. My tunnel is relatively short and the above noted suction moves all kinds of material along the smooth inside walls of this tunnel to the throat where the beater bars act on it.

It is important that these beater bars are of such length that their ends travel almost in contact with the ground. Further, the beater bars which are rectangular throughout can be shifted from end to end and turned from side to side. This also is true of the beater bars with the cutting beater edge, which can be used either as hammerbars with the back edge or as cutting bars with the bevelled edge.

I claim:

1. In a machine for disintegrating vegetable stalks embodying a stalk gathering tunnel having open front and rear ends and adapted to pass over a row of vegetable stalks, a rotatably driven shaft supported above the tunnel and projecting beyond the rear end of the tunnel, the improvement consisting of a pair of laterally spaced members carried on the shaft in rear of the tunnel for rotation in a plane transverse to the tunnel, a plurality of pivots extending between said spaced members adjacent their peripheries and at a maximum permissible distance from the axis of the shaft, and an elongated beater bar rotatably mounted on each of said pivots and in sliding contact with the inner sides of said spaced members, each of said bars at its outer free end being substantially rectangular in cross-section to provide a blunt striking surface and having a beveled cutting edge spaced inwardly from the outer end to form a cutting surface.

2. In a machine for disintegrating vegetable stalks, in combination, a stalk gathering tunnel formed of a top wall and side walls which diverge from an enlarged front open end to a restricted rear open end, an angular shaped shear plate carried on the rear end of the tunnel extending vertically along one side and horizontally across the top of the tunnel, the inner edge of said plate having a beveled cutting surface thereon, a driven member supported above the tunnel and projecting longitudinally beyond the rear end of the tunnel, and a plurality of rectangular beater bars pivotally supported at one end on said driven member for rotation in a plane parallel to the shear plate, at least one of said bars having a beveled edge intermediate its opposite ends to form a cutting edge which cooperates with the cutting edge of the shear plate.

3. In a machine for disintegrating vegetable stalks, in combination, a stalk gathering tunnel having front and rear ends, a shear plate having a beveled cutting edge mounted on the rear end of the tunnel and at one side thereof, a driven shaft supported above the tunnel and projecting longitudinally beyond the rear end of the tunnel, a pair of spaced plates mounted on the shaft in rear of the tunnel, a plurality of pivots extending between said plates adjacent their peripheries and at a maximum permissible distance from the axis of the shaft, and an elongated beater bar rotatably mounted on each of said pivots and in sliding contact with the inner sides of said plates for rotation in a plane parallel with the shear plate, each of said bars at its outer free end being substantially rectangular in cross-section to provide a blunt striking surface and having a bevelled cutting edge spaced inwardly from the outer end to form a cutting surface which co-acts with the shear plate.

4. In a machine for disintegrating vegetable stalks, in combination, a stalk gathering tunnel having front and rear ends, a shear plate mounted on the rear end of the tunnel and at one side thereof, said plate having portions which extend at substantially 90 degrees with respect to each other, the inner edges of said plate having a beveled cutting edge formed thereon, a driven shaft supported above the tunnel and projecting beyond the rear end of the tunnel, a pair of rectangular plates mounted in spaced relation to each other on the shaft in rear of the tunnel, a relatively heavy rectangular beater bar pivotally supported at one end between said rectangular plates at each corner thereof in such a manner as to produce a multiple flailing action immediately in rear of the tunnel and in a plane parallel to the shear plate, at least one of said bars intermediate its opposite ends having a beveled edge to form a cutting edge which cooperates with the cutting edge on the plate when the shaft is driven.

5. In a machine for disintegrating vegetable stalks, in combination, a stalk gathering tunnel having front and rear ends, a shear plate having a beveled cutting edge mounted on the rear end of the tunnel and at one side thereof, a driven shaft supported above the tunnel and projecting beyond the rear end of the tunnel, a pair of rectangular plates mounted in spaced relation to each other on the shaft in rear of the tunnel, a relatively heavy rectangular beater bar pivotally supported at one end between said rectangular plates at each corner thereof in such a manner as to produce a multiple flailing action immediately in rear of the tunnel and in a plane parallel to the shear plate, one of said bars at its free end being substantially rectangular in cross-section to form a blunt striking surface, said bar having a beveled edge intermediate its opposite ends to form a cutting edge which cooperates with the cutting edge of the shear plate when the shaft is driven.

6. In a machine for disintegrating vegetable stalks, in combination, a stalk gathering tunnel formed of a top and side walls and having open front and rear ends, a shear plate carried on the rear end of the tunnel and at one side thereof, said plate having a beveled cut edge which extends along one edge and across the top open rear end of the tunnel, a rotatably driven member supported above the tunnel and projecting longitudinally beyond the rear end of the tunnel, and a plurality of elongated rectangular beater bars pivotally mounted on said driven member for rotation in rear of the tunnel and in a plane parallel to the shear plate, one of said bars having a relatively blunt surface extending throughout its entire lateral striking edge, another of said bars having relatively blunt striking surfaces disposed on the opposite ends of the bar and having a beveled cutting edge intermediate the blunt edges, both of said bars cooperating with the beveled edges of the shear plate for shearing stalks gathered by the tunnel.

LEVI HAAPALA.

REFERENCES CITED

The following references are of record in the file of this patent:

UNITED STATES PATENTS

| Number | Name | Date |
| --- | --- | --- |
| 657,411 | Hamm | Sept. 4, 1900 |
| 1,628,101 | Baldwin | May 10, 1927 |
| 1,698,724 | Johnston et al. | Jan. 15, 1929 |
| 2,479,510 | Pollard et al. | Aug. 16, 1949 |
| 2,484,802 | Aasland | Oct. 18, 1949 |